United States Patent

[11] 3,591,706

[72] Inventors Norman Neville Parker-Smith
Billericay;
Pedro Martinez, Great Baddow, both of, England
[21] Appl. No. 776,212
[22] Filed Nov. 15, 1968
[45] Patented July 6, 1971
[73] Assignee The Marconi Company Limited
London, England
[32] Priority Dec. 22, 1967
[33] Great Britain
[31] 58280/67

[54] MULTI-IMAGE TELEVISION CAMERA
8 Claims, 7 Drawing Figs.

[52] U.S. Cl. .......... 178/5.4 ST, 178/7.2
[51] Int. Cl. .......... H04n 9/06
[50] Field of Search .......... 178/5.4, 5.4 ST, 5.2, 7.2

[56] References Cited

UNITED STATES PATENTS

| | | | |
|---|---|---|---|
| 2,389,646 | 11/1945 | Sleeper | 178/5.4 (STC) |
| 2,552,464 | 5/1951 | Siezen | 178/5.4 (STC) |
| 2,603,706 | 7/1952 | Sleeper | 178/5.4 (STC) |

*Primary Examiner*—Robert L. Griffin
*Assistant Examiner*—Richard P. Lange
*Attorney*—Baldwin, Wight, Diller & Brown

ABSTRACT: A camera in which a number of optical images of a subject of transmission are optically projected adjacent one another on a cathode-ray image-receiving screen and the single cathode-ray beam of the tube scans a number of different electrical images corresponding to the optical images in similar line rasters, the beam being interrupted during scanning at a frequency which is high relative to the picture frequency and being deflected at a frequency correlated with the interruption frequency between the electrical images whereby, although the electrical images are similarly scanned in lines, output video signals which occur successively in time are developed from points in different electrical images.

INVENTORS
Norman Neville Parker-Smith
and
Pedro Martinez
BY Baldwin Wight Diller & Brown, ATTORNEYS INVENTORS
Norman Neville Parker-Smith
and
Pedro Martinez
BY Baldwin Wight Diller & Brown, ATTORNEYS

MULTI-IMAGE TELEVISION CAMERA

This invention relates to multi image television cameras by which expression is meant, in this specification, television cameras in which two, or more, optical images (or electrical images derived therefrom) of a subject of transmission are scanned to develop video signals for transmission.

The two best known forms of multi image television cameras as at present in use are color television cameras and stereoscopic television cameras. In certain color television cameras three differently colored optical images (in the component primary colors, red, green and blue) of a subject of transmission are produced and projected, by suitable optical means, each on to the optical image-receiving member of a separate camera cathode-ray tube such as an Image Orthicon tube or a Vidicon tube which develops video signals from the optical image it receives. In other color television cameras four optical images are produced, three being in the three different primary colors and the fourth being a so-called "luminance" or uncolored image, and each of these four optical images is projected optically on to the optical image-receiving member of a separate television camera tube which is appropriated thereto. In both cases all the camera tubes employed—three in the first-mentioned example and four in the second—are subjected to synchronous line and field deflections so that all of them scan the electrical images (which are produced in the usual way in the tubes and correspond, of course, to the optical images) synchronously to develop video signals which are processed and transmitted in well-known manner for use in cooperating receivers.

Similarly, in a known form of stereoscopic television camera, "right eye" and "left eye" optical images of a subject of transmission are optically projected each on to the optical image-receiving member of a separate camera tube and the two tubes are subjected to synchronous line and field-scanning deflections so that they scan the electrical images (produced in the tubes and corresponding to the optical images) synchronously to develop video signals for processing and transmission.

In the foregoing typical known color television and stereoscopic television cameras and, indeed generally in multiimage television cameras of the usual kind in which the separate images are projected on to the optical image receiving members of separate synchronously operated camera tubes, it is necessary that the separate optical images shall precisely correspond with one another and that the scanning of the electrical images produced in the tubes from the said optical images shall also be, to a very high degree, precise and accurate both as respects synchronism of scanning and identity of scanning patterns or rasters, otherwise there will be faults of misregistration when the developed video signals are utilized for picture reproduction at a cooperating receiver. The obtaining of precision as respects the optical images does not present a problem which is really difficult of solution because optical means—lenses, prisms, mirrors and so on—are employed for this and optical means of high accuracy are currently available. The provision of precisely accurate synchronized scanning, with precisely accurate scanning rasters, of electrical images precisely corresponding to the optical images presents a problem which is much more difficult of solution in practice and misregistration faults in multi image color television cameras employing separate camera tubes for separate differently colored optical images are very difficult to avoid and involve the television camera designer in the provision of expensive circuitry and circuit elements. As is well known, in color television cameras quite small misregistration faults as between differently colored images can produce subjectively, very large errors of color in reproduction at a cooperating receiver. Moreover the provision of a multiplicity of separate camera tubes, one for each primary color and each with its own deflection system and operating power supplies is an expensive matter. The present invention seeks to overcome or reduce these difficulties and disadvantages.

Advantages of the invention are that correct registration is obtained independently of line and field scans amplitudes and linearities registration, as respects electrical images produced in a common camera tube being dependent only in the component shift wave forms used in effect to switch the cathode-ray in the tube from one scanned image to another. Misregistration due to optical and geometrical imperfections will, of course, still be present but these are not difficult to avoid by good design in accordance with known practice. Moreover the number of camera tubes employed is reduced as compared to usual current practice. Thus a stereoscopic television camera could have only one camera tube (instead of the two tube camera of current practice) with "right eye" and "left eye" optical images projected on to the same tube. Again a color television camera in accordance with this invention could have only one camera tube with "red" "blue" and "green" optical images projected on to same tube (this compares with a three tube camera of correct practice); or it could have two tubes with a Y ("luminance") image projected on to one tube and "red" "blue" and "green" images projected on to the other (this compares with a four tube camera of correct practice); or it could have two tubes with a Y image projected on to one tube and two different primary color images projected on to the other, the third primary color signals being obtained by the known method of subtraction (this compares with a three tube camera of current practice).

The invention is illustrated in and further explained in connection with the accompanying drawings which show schematically various methods of carrying it into effect.

Figure 1:
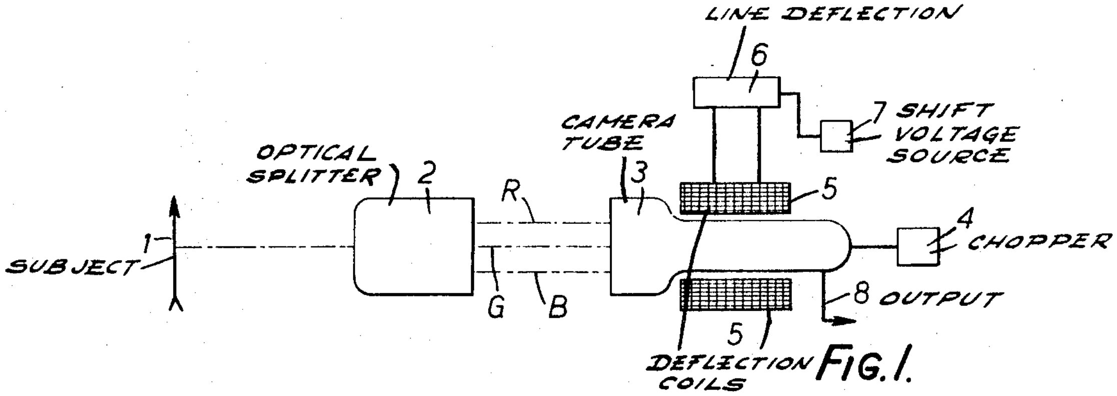
FIGS. 1 and 5 are diagrammatic representations of color television cameras in accordance with this invention.
Figure 3:
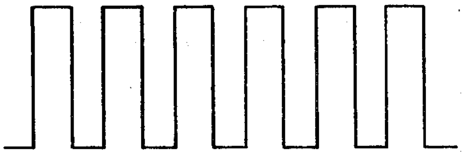
Figure 4:
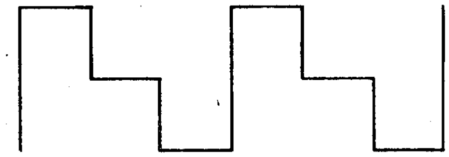
Figure 5:
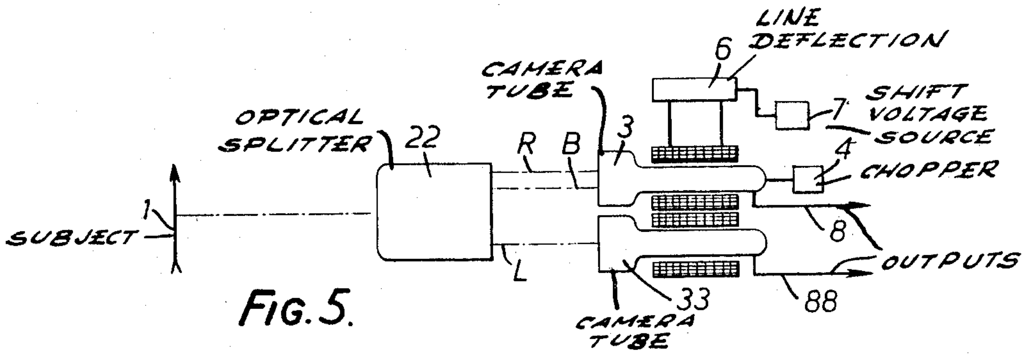
Figure 7:
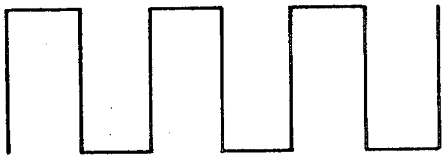

FIGS. 3, 4, and 7 are explanatory electrical wave forms used in FIGS. 1 and 5 respectively.

Figure 2:
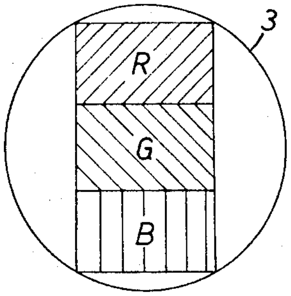
FIGS. 2 and 6 are schematic representations of the three primary color optical images on the optical image-receiving face or member of the tube in FIGS. 1 and 5.

Referring to FIG. 1 light from a subject of transmission represented by the arrow 1 is passed to a light-splitting color-splitting optical system 2 of any suitable known nature—for example a system utilizing dichroic mirrors—which focuses three images of the said subject of the optical image-receiving member of a known television camera tube 3 e.g. and Image Orthicon. The three images are primary color images of red, green and blue but are otherwise identical. They are projected so as to be one above the other and immediately adjacent to one another on the faceplate of the tube 3 as best indicated in FIG. 2 in which the three images are indicated by the letters R G and B (also used in FIG. 1 to indicate the center rays of the light paths from the optical system 2 to the said images).

Within the tube 3 the optical images are translated in well-known way into corresponding electrical charge images and these are scanned by a single cathode-ray to develop output video signals. While the ray is scanning it is "chopped" i.e. the cathode-ray is interrupted, at a frequency which is high in relation to the highest video frequency. The frequency of interruption might be, for example, 30 mc./s. This "chopping" or modulation of the cathode-ray is schematically indicated in FIG. 1 as effected by a rectangular wave from a source 4 which applies a suitable wave form to a control electrode of the electron gun of the tube so that the ray current wave form is as illustrated by FIG. 3.

The tube 3 is represented in FIG. 1 as having a deflection coil system 5 which includes line deflection and filed deflection coils. Block 6 represents sources of deflection current waves. Horizontal (line) scanning current sawtooth waves are supplied to the line deflection windings included in the coil unit 5 so that the scanning lines are uniform throughout scanning, the line deflecting current waves being obtained from a single source included in block 6. The said block 6 also includes a field-deflecting wave source of sawtooth current waves of an amplitude suited to the height (in FIG. 2) of any one of the three electrical charge images in the tube. However, in accordance with this invention there is superimposed upon the field deflection component thus obtained a shift field deflection component such that the vertical shift waveform is as typified by FIG. 4. In FIG. 1 the superimposed shift is indicated as obtained from a suitable shift voltage source 7. The shift is at a lower frequency co-related with the frequency of interruption. As will be apparent the scanning cathode ray is caused to shift between the three images during scanning and the result is an output video signal, appearing on the output lead 8, which is a dot sequential signal on a carrier of the frequency of cathode-ray interruption. Video signals corresponding to the three images can obviously be recovered from this dot sequential signal by synchronized detection thereof. The camera of FIG. 1 is a substitute for what would, in current practice, be a three tube camera.

Figure 6:
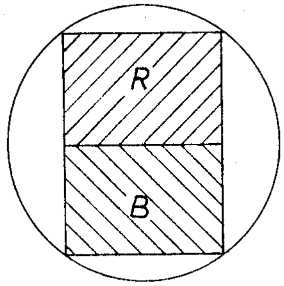

FIG. 5 shows a modified color television camera in which there are two camera tubes 3 and 33 one of which receives only two primary color images (instead of three as in FIG. 1) and the other of which receives an uncolored image and is utilized to provide a luminance or Y signal. FIG. 5 requires little explanation in view of the description already given in FIG. 1. In FIG. 5 a suitable optical unit, here referenced 22, projects two different primary color images, red and blue, on to the optical image-receiving member 3 where they appear one above the other as shown in FIG. 6. The ray in tube 3 of FIG. 5 is "chopped" as in FIG. 1 by gun modulating potentials from a source 4 and is deflected in the same way as in the case of tube 3 of FIG. 1 except, of course, that, as there are only two (instead of three) images in the tube 3 of FIG. 5 a different shift waveform is used. FIG. 7 shows the shift wave form used for the two-image tube in the camera of FIG. 5. The optical unit 22 provides an uncolored image on the receiving member of the second tube 33, the central ray to this image being referenced L. The ray in the luminance tube 33 of FIG. 5 is caused to scan in lines in the usual way, the ray in this tube being uninterrupted and the line and field deflecting waves employed being the same as for tube 3 except, of course, that there are no superimposed shift voltages. Dot sequential video color signals on a carrier appear on the output lead 8 of tube 3 and luminance video signals appear on the output lead 88 of tube 33. After recovery of the color image signals by synchronized detection of the output from tube 3 the three resultant video signals, two of color and one of luminance, may be processed and utilized in any manner known per se, the third primary color (green) being recovered by subtraction in accordance with well-known practice. The camera of FIG. 5 is a substitute for a four-tube camera of current practice.

We claim:

1. A multi-image television camera comprising optical means for projecting a plurality of optical images of a subject of transmission on to an optical image-receiving member of a cathode-ray camera tube, so that said images are adjacent to one another, said cathode-ray camera tube having a means for producing a single cathode-ray beam; scanning means for causing the single cathode-ray of said tube to scan at a given frequency a plurality of different electrical images corresponding to said optical images in similar line rasters; interrupting means for interrupting said beam during scanning at an interrupting frequency which is high in relation to said given frequency; and waveform, means for deflecting said beam at a frequency co-related with said interruption frequency, between said electrical images whereby, although said electrical images are similarly scanned in lines, output video signals which occur successively in time are developed from points in different electrical images; and wherein said scanning means comprise means for deflecting the cathode-ray beam in the field deflection direction, the last-said means producing a sawtooth waveform of an amplitude suited to the height of any one of the plurality of images, and said deflecting means comprises means for superimposing a shift field deflection waveform on said sawtooth waveform said shift field deflection waveform having a frequency high in relation to line deflection frequency and having a plurality of discrete values, one for each of the said electrical images whereby said cathode-ray beam is caused to shift between corresponding points on the said electrical images during line scans; and said interrupting means comprise means for interrupting the cathode-ray beam during transitions between the discrete values output signal is obtained in which succeeding elements of which are derived from each of the plurality of electrical images in turn.

2. A camera as claimed in claim 1 wherein the interrupting means operates at an interruption frequency of about 30 mc./s.

3. A camera as claimed in claim 1 wherein said optical means comprise means for projecting three optical images of a subject of transmission on to said optical image-receiving member.

4. A camera as claimed in claim 3 wherein said optical means comprise a light-splitting, color-splitting optical system.

5. A camera as claimed in claim 1 wherein said optical means comprise means for projecting three optical images of a subject of transmission on to said optical image-receiving member.

6. A camera as claimed in claim 5 wherein said optical means comprise a light-splitting, color-splitting optical system.

7. A camera as claimed in claim 1 wherein said optical means comprise means for projecting two optical images of a subject of transmission on to said optical image-receiving member, said optical means being a light-splitting, color-splitting optical system.

8. A camera as claimed in claim 7 further comprising a second camera tube, said optical system providing an uncolored image of said subject of transmission on to the optical image-receiving member of said second camera tube.